(12) United States Patent
Sampath

(10) Patent No.: US 9,120,580 B2
(45) Date of Patent: Sep. 1, 2015

(54) EJECTOR-DRIVEN FUEL STABILIZATION SYSTEM

(75) Inventor: Parthasarathy Sampath, Ontario, CA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 295 days.

(21) Appl. No.: 13/222,614

(22) Filed: Aug. 31, 2011

(65) Prior Publication Data
US 2013/0047845 A1 Feb. 28, 2013

(51) Int. Cl.
*B01D 53/22* (2006.01)
*B64D 37/34* (2006.01)
*B01D 19/00* (2006.01)

(52) U.S. Cl.
CPC ............ *B64D 37/34* (2013.01); *B01D 19/0031* (2013.01)

(58) Field of Classification Search
CPC ............................ B64D 37/34; B01D 19/0031
USPC ...................................... 95/43, 45, 46; 96/4, 6
See application file for complete search history.

(56) References Cited

U.S. PATENT DOCUMENTS

| | | | | |
|---|---|---|---|---|
| 3,552,883 A | * | 1/1971 | Weatherbee | 417/76 |
| 3,739,984 A | * | 6/1973 | Tontini | 239/265.17 |
| 4,006,260 A | * | 2/1977 | Webb et al. | 426/438 |
| 4,035,166 A | * | 7/1977 | Van Hecke | 95/163 |
| 4,339,917 A | * | 7/1982 | LaGrone | 60/39.281 |
| 4,358,249 A | * | 11/1982 | Hanson | 417/179 |
| 4,386,944 A | * | 6/1983 | Kimura | 95/51 |
| 4,537,606 A | * | 8/1985 | Itoh et al. | 96/7 |
| 4,595,344 A | * | 6/1986 | Briley | 417/185 |
| 4,772,385 A | * | 9/1988 | Yamada et al. | 210/87 |
| 5,279,647 A | * | 1/1994 | Gatten et al. | 96/6 |

(Continued)

FOREIGN PATENT DOCUMENTS

| | | | |
|---|---|---|---|
| EP | 1688349 A1 | * | 8/2006 |
| GB | EP1553344 A3 | * | 7/2005 |

OTHER PUBLICATIONS

Watanawanavet, "Optimization of a High-Efficiency Jet Ejector by Computational Fluid Dynamics Software" Texas A&M University 2005 http://repository.tamu.edu/bitstream/handle/1969.1/2432/etd-tamu-2005A-CHEN-Watanaw.pdf.*

(Continued)

*Primary Examiner* — Jason M Greene
*Assistant Examiner* — Anthony Shumate
(74) *Attorney, Agent, or Firm* — Carlson, Gaskey & Olds, P.C.

(57) ABSTRACT

A fuel stabilization unit includes a fuel inlet and outlet, an oxygen permeable membrane and a vacuum source. The vacuum source employs an ejector and a high pressure fluid to generate an oxygen partial pressure differential across the membrane. A fuel deoxygenation system includes a fuel stabilization unit and a vacuum source. The fuel stabilization unit has a fuel flow path, a vacuum chamber and an oxygen permeable membrane separating the fuel flow path and the vacuum chamber. The vacuum source employs an ejector and a high pressure fluid to reduce pressure in the vacuum chamber to generate an oxygen partial pressure differential across the oxygen permeable membrane. A method for deoxygenating a fuel includes delivering a high pressure fluid to an ejector, generating an oxygen partial pressure differential across an oxygen permeable membrane using only the ejector and removing oxygen from the fuel using the oxygen partial pressure differential.

19 Claims, 3 Drawing Sheets

(56) References Cited

U.S. PATENT DOCUMENTS

| | | | | |
|---|---|---|---|---|
| 5,698,011 | A * | 12/1997 | Chung et al. | 95/45 |
| 5,762,684 | A * | 6/1998 | Hayashi et al. | 95/24 |
| 6,485,545 | B1 * | 11/2002 | Ohlrogge et al. | 96/4 |
| 6,588,499 | B1 * | 7/2003 | Fahlsing | 165/231 |
| 6,772,821 | B1 * | 8/2004 | Fulton et al. | 164/150.1 |
| 6,911,504 | B2 * | 6/2005 | Reiling | 526/68 |
| 7,081,153 | B2 * | 7/2006 | Leigh et al. | 95/14 |
| 7,118,612 | B2 * | 10/2006 | Shreiber et al. | 95/54 |
| 7,497,895 | B2 * | 3/2009 | Sabottke | 95/45 |
| 7,601,203 | B2 | 10/2009 | Reeve et al. | |
| 7,767,077 | B2 * | 8/2010 | Yoneda et al. | 210/97 |
| 2005/0115404 | A1 * | 6/2005 | Leigh et al. | 95/11 |
| 2007/0218326 | A1 * | 9/2007 | Liu et al. | 429/22 |
| 2007/0256558 | A1 * | 11/2007 | Schwalm | 95/45 |
| 2008/0098894 | A1 * | 5/2008 | Sabatino et al. | 96/6 |
| 2008/0118371 | A1 * | 5/2008 | Vasquez et al. | 417/77 |
| 2010/0162682 | A1 * | 7/2010 | Lerg | 60/226.1 |
| 2010/0230366 | A1 * | 9/2010 | Bigeonneau et al. | 210/750 |
| 2011/0011264 | A1 * | 1/2011 | Makino et al. | 96/6 |
| 2011/0185891 | A1 * | 8/2011 | Straub et al. | 95/8 |
| 2012/0312379 | A1 * | 12/2012 | Gielda et al. | 137/1 |
| 2013/0217140 | A1 * | 8/2013 | Fietzek | 436/141 |

OTHER PUBLICATIONS

Richenberg et al. "Ejectors, Steam Jet," Encyclopedia of Chemical Processing and Design, vol. 17, pp. 167-194, 1976.*
Green, Don W.; Perry, Robert H. In: McGraw Hill Professional. Edition: 8th ed. New York : McGraw-Hill. 2008. "Perry's Chemcial Engineers' Handbook" pp. 10-39, 10-42.*

* cited by examiner

EJECTOR-DRIVEN FUEL STABILIZATION SYSTEM

BACKGROUND

This invention relates to a vacuum system for a fuel stabilization unit (FSU) for a gas turbine engine. More particularly, this invention relates to an ejector-driven system for generating a vacuum utilized in removing dissolved oxygen from a fuel stream.

A fuel stabilization unit (FSU) reduces the amount of oxygen dissolved within fuel for a gas turbine engine. Reducing the amount of oxygen in a fuel increases the maximum allowable temperature of the fuel, thereby increasing its heat sink capacity when used for cooling components onboard the aircraft. One method of removing dissolved oxygen from fuels is by using a semi-permeable membrane deoxygenator. In a membrane deoxygenator, fuel is pumped over an oxygen permeable membrane. As the fuel passes over the membrane, a partial oxygen pressure differential across the membrane promotes the transport of oxygen out of the fuel through the membrane.

A vacuum is one means of generating the required partial oxygen pressure differential. Typically, multi-stage vacuums are created using vacuum pumps. Each vacuum pump is sized according to the volume of waste flow that passes through the vacuum pump. The volume of waste flow is dependant on the amount of deoxygenation required for the system. As the size of vacuum pumps increase so does the cost and overall weight of the system. As can be appreciated, space aboard an aircraft is limited and any increase in device size affects overall configuration and operation.

SUMMARY

A fuel stabilization unit includes a fuel inlet, a fuel outlet, an oxygen permeable membrane and a vacuum source. The vacuum source generates an oxygen partial pressure differential across the oxygen permeable membrane and employs an ejector and a stream of high pressure fluid flowing through the ejector.

A fuel deoxygenation system includes a fuel stabilization unit and a vacuum source. The fuel stabilization unit has a fuel flow path with a fuel inlet and a fuel outlet. The fuel stabilization unit also has a vacuum chamber and an oxygen permeable membrane separating the fuel flow path and the vacuum chamber. The vacuum source reduces pressure in the vacuum chamber to generate an oxygen partial pressure differential across the oxygen permeable membrane. The vacuum source employs an ejector and a stream of high pressure fluid flowing through the ejector.

A method for deoxygenating a fuel includes delivering a high pressure fluid to an ejector, generating an oxygen partial pressure differential across an oxygen permeable membrane in contact with the fuel using only the ejector and removing oxygen from the fuel using the oxygen partial pressure differential.

DETAILED DESCRIPTION

The present invention provides a simple and lightweight fuel deoxygenation system and a method for deoxygenating fuel. An ejector receiving a stream of high pressure fluid is used to create a single vacuum source that facilitates fuel deoxygenation. No vacuum pumps or other secondary vacuum sources are used so that the system weight is minimal.

Figure 1:
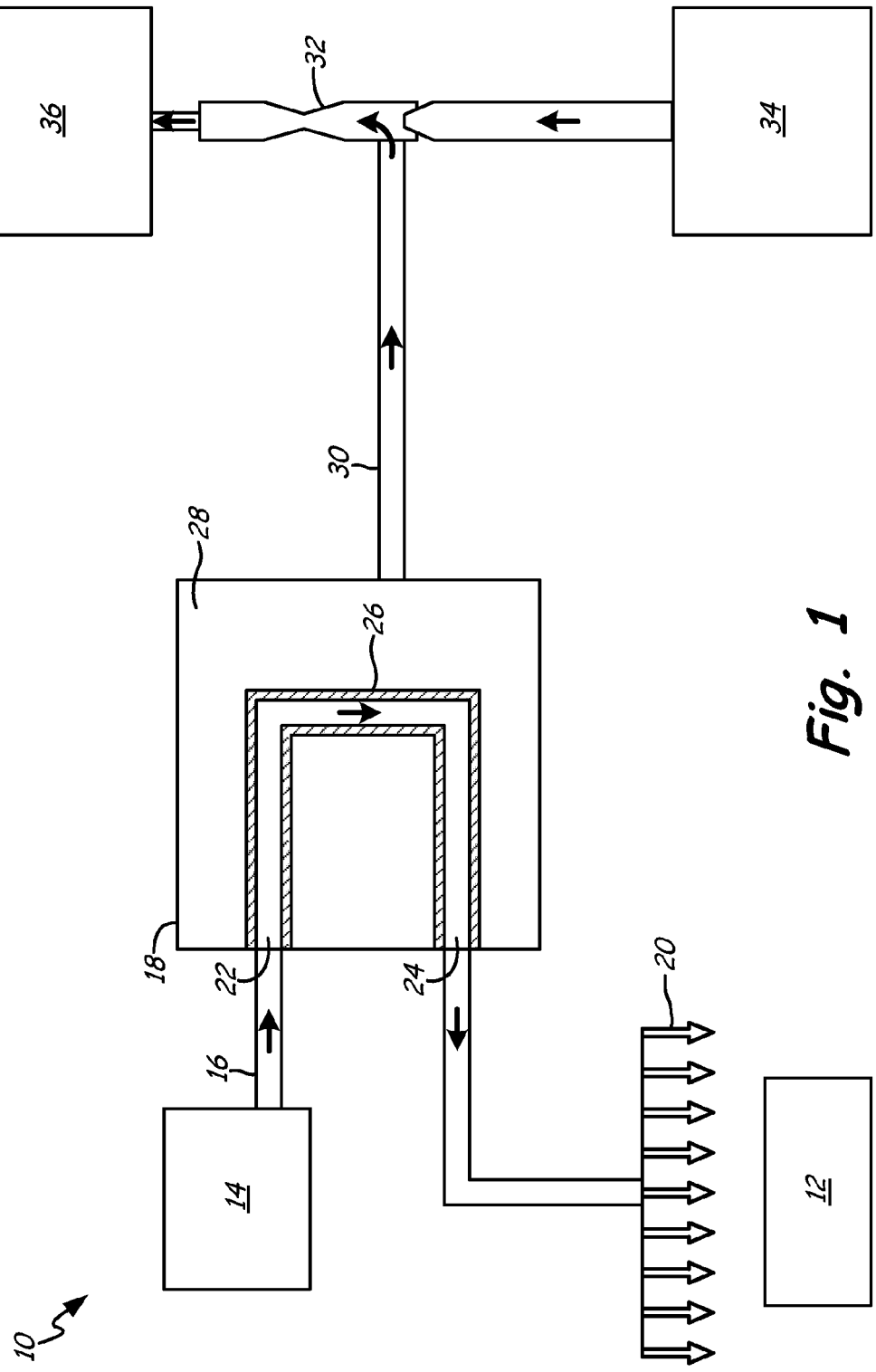
FIG. 1 shows an example fuel delivery system for a gas turbine engine.

FIG. 1 illustrates a fuel delivery system for a gas turbine engine. Fuel delivery system 10 delivers fuel to gas turbine engine 12. Fuel from fuel supply 14 flows through fuel flow path (fuel passage) 16 to fuel stabilization unit (FSU) 18 where the fuel is deoxygenated. The fuel continues to flow through fuel path 16, exiting FSU 18, and is discharged from fuel nozzles 20 into engine 12.

FSU 18 removes oxygen and other constituents (such as nitrogen and light hydrocarbons) from the fuel flowing through FSU 18. Fuel flowing through fuel flow path 16 enters FSU 18 through fuel inlet 22 and exits FSU 18 through fuel outlet 24. Within FSU 18, fuel flow path 16 is bounded by oxygen permeable membrane 26 and passes through vacuum chamber 28.

Oxygen permeable membrane 26 separates oxygen from the fuel flowing through fuel flow path 16 in FSU 18. Oxygen and other small molecules can cross oxygen permeable membrane 26, while the main fuel components cannot. Oxygen transmits across oxygen permeable membrane 26 depending on the oxygen partial pressures on the fuel side (within fuel flow path 16) and the vacuum side (inside vacuum chamber 28) of the membrane. For example, when the partial pressure of oxygen is lower in vacuum chamber 28 than the partial pressure of oxygen in fuel flow path 16, oxygen from the fuel flowing in fuel flow path 16 crosses oxygen permeable membrane 26 to enter vacuum chamber 28. Thus, reducing the partial pressure of oxygen on the vacuum side of oxygen permeable membrane 26 so that it is lower than the partial pressure of oxygen on the fuel side of the membrane enables deoxygenation of fuel.

Oxygen permeable membrane 26 can be composed of any material that allows for the separation of oxygen from a fuel stream. In exemplary embodiments, oxygen permeable membrane 26 includes tetrafluoroethylene, such as polytetrafluoroethylene (PTFE) and Teflon® AF. In exemplary embodiments, oxygen permeable membrane 26 is a dense (non-porous) film and has a thickness between about 0.1 microns and about 2 microns. Depending on membrane composition, in some embodiments, oxygen permeable membrane 26 will be permeable to some other gases (e.g., nitrogen) and light hydrocarbons.

Vacuum chamber 28 is connected to vacuum line 30. Vacuum line 30 communicates with ejector 32. Ejectors are simple and efficient mechanisms for creating vacuum pressure by means of the Venturi effect. Ejector 32 is used to create a vacuum in vacuum chamber 28, reducing the partial pressure of oxygen on the vacuum side of oxygen permeable membrane 26. Ejector 32 includes two concentric tubes—an inner tube for a primary (motive) fluid and an outer tube for a suction fluid. Ejector 32 communicates with a source of high pressure fluid (motive fluid). High pressure fluid source 34 delivers high pressure fluid to ejector 32 to create a vacuum. As the high pressure fluid flows through the inner tube of ejector 32, a low pressure zone is created within ejector 32, drawing in suction fluid (a vacuum stream) into the outer tube of ejector 32 from vacuum line 30 and vacuum chamber 28. The vacuum stream exits vacuum chamber 28 (and FSU 18)

and flows through vacuum line 30 to ejector 32. The vacuum stream and motive fluid then flow from ejector 32 into sink 36 or another disposal device.

By creating the vacuum stream within and removing it from vacuum chamber 28 using ejector 32, the partial pressure of oxygen on the vacuum side of oxygen permeable membrane 26 is reduced. As the partial pressure of oxygen on the vacuum side of the membrane is reduced, oxygen present in the fuel flowing through fuel flow path 16 crosses oxygen permeable membrane 26 from the fuel side to the vacuum side, thereby deoxygenating the fuel. The heavier fuel molecules cannot pass through oxygen permeable membrane 26 and continue to flow within fuel path 16 toward gas turbine engine 12. The vacuum stream from vacuum chamber 28 includes the discharge from the fuel as a result of the deoxygenation process.

Ejector 32 is designed to generate a strong vacuum in vacuum chamber 28 using a small quantity of high pressure motive fluid. In order to generate an appropriate vacuum in vacuum chamber 28, ejector 32 possesses a low ejector area ratio. The ejector area ratio is a ratio of the area of the opening that permits secondary, or suction, air flow in the ejector to the area of the opening that permits primary, or motive, air flow in the ejector. Typically, conventional ejectors are designed with high ejector area ratios (area ratios greater than or equal to 1). Conventional ejectors are not suited for use as the sole vacuum source in a fuel deoxygenation system as noted in U.S. Pat. No. 7,601,203 ("the '203 patent"). These conventional ejectors require high motive flows to reach the low vacuum pressures needed for fuel deoxygenation. To remedy this, the '203 patent describes using a vacuum pump to generate an additional vacuum stage necessary for deoxygenating fuel.

In contrast to conventional ejectors, ejector 32 provides a low pressure at the suction inlet without high volume flow of the motive fluid. In exemplary embodiments, the motive fluid has a flow rate between about 0.001 kg/s and about 0.1 kg/s. These flow rates allow the efficient use of air bled from other parts of engine 12 to serve as the motive fluid, described in further detail below. In exemplary embodiments, ejector 32 has an ejector area ratio between about 0.05 and 0.2. In one embodiment, ejector 32 has an ejector area ratio of about 0.1. These ejector area ratios reduce the partial pressure of oxygen on the vacuum side of oxygen permeable membrane 26 to a level where fuel deoxygenation can occur and oxygen and other small molecules separated from the fuel can be removed from vacuum chamber 28. The ejector area ratio can be optimized based on the expected oxygen levels in the fuel and the flow rates of the motive fluid. In exemplary embodiments, the ratio of motive flow (flow of the motive fluid through the ejector) to vacuum flow (flow of air from vacuum chamber 28 through the ejector) is below about 0.3.

High pressure fluid source 34 provides high pressure fluid as the motive fluid in ejector 32. In exemplary embodiments, high pressure fluid source 34 is a fan or compressor stage of gas turbine engine 12. Fluid bled from the fan or compressor of engine 12 is directed to ejector 32. Both the fan and compressor of a gas turbine engine generate high pressure fluid suitable for use as the motive fluid in ejector 32. Fluid bled from the compressor has a higher temperature and higher pressure than fluid bled from the fan, providing greater effectiveness as motive fluid in ejector 32. Lower temperature and lower pressure fluid bled from the fan stage is less costly from an engine efficiency perspective, however. Fluid bled from both a fan stage and a compression stage of a gas turbine engine can also be used together to provide motive fluid to ejector 32.

The high pressure fluid from high pressure fluid source 34 flowing through ejector 32 generates a vacuum in vacuum chamber 28. The vacuum reduces the partial pressure of oxygen on the vacuum side of oxygen permeable membrane 26. In exemplary embodiments, the pressure in vacuum chamber 28 on the vacuum side of oxygen permeable membrane 26 during fuel deoxygenation is between about 2.0 kilopascals (kPa) (15 torr) and about 6.7 kPa (50 torr). A vacuum level between about 0.13 kPa (1 torr) and about 10 kPa (75 torr) is maintained on the ejector side.

The combination of high pressure fluid from high pressure fluid source 34 and the ejector area ratio of ejector 32 eliminate the need for a secondary vacuum source. Unlike the '203 patent, no vacuum pumps are required to provide the vacuum in vacuum chamber 28 needed for fuel deoxygenation according to the present invention. By eliminating the need for a vacuum pump, the weight of fuel delivery system 10 is reduced compared to other delivery systems.

Figure 2:
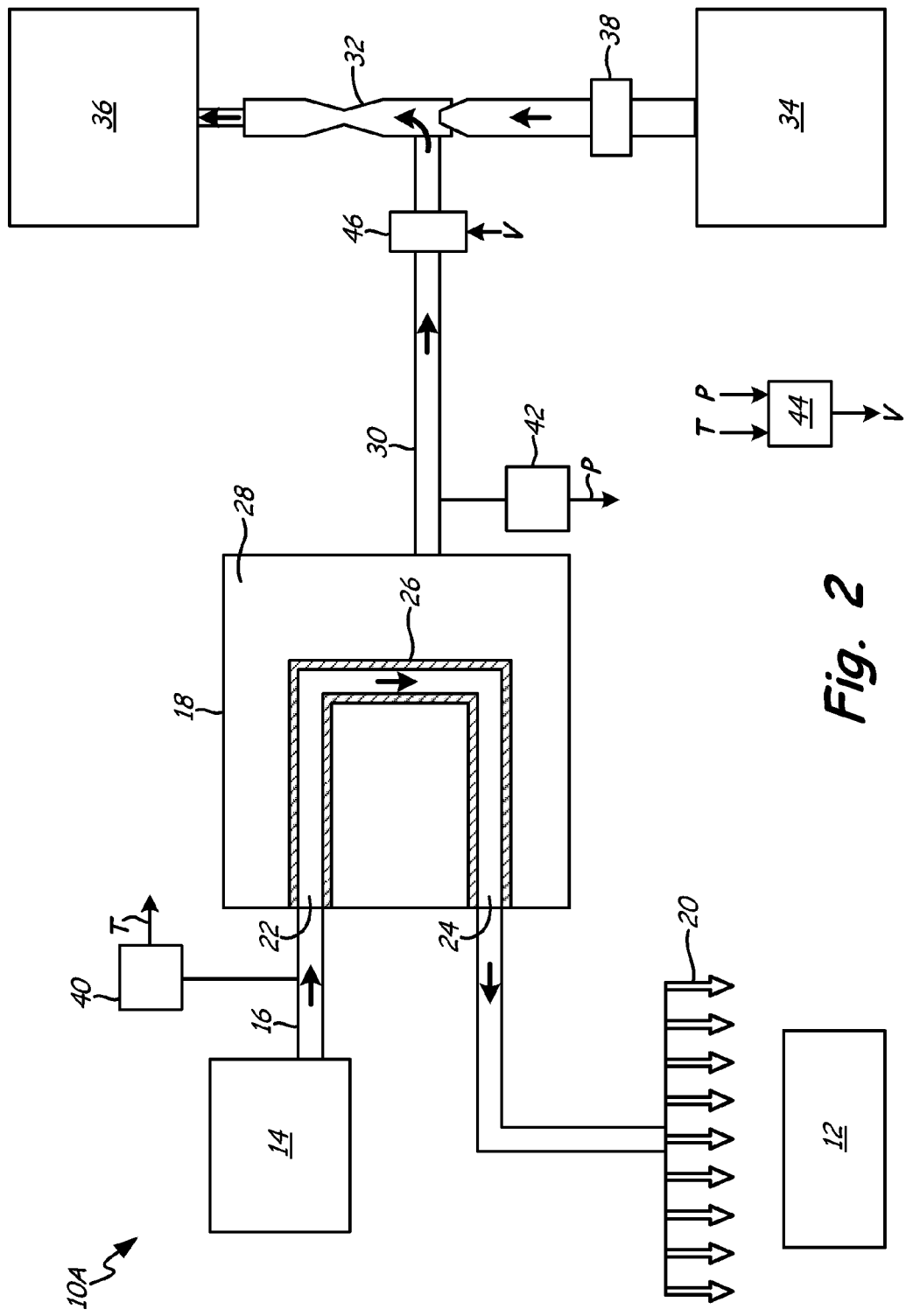
FIG. 2 is another example fuel delivery system for a gas turbine engine.

FIG. 2 illustrates another fuel delivery system for a gas turbine engine. Fuel delivery system 10A includes the components of fuel delivery system 10 described above as well as additional components. Fuel delivery system 10A includes throttle valve 38 between high pressure fluid source 34 and ejector 32. Throttle valve 38 controls the flow of high pressure fluid from high pressure fluid source 34 to ejector 32. Throttle valve 38 reduces the flow of the high pressure fluid when the pressure of the fluid exceeds ejector requirements. Throttle valve 38 also conditions the flow of high pressure fluid to prevent pressure surges from affecting the vacuum in vacuum chamber 28.

Fuel delivery system 10A also includes temperature sensor 40 and pressure sensor 42. Temperature sensor 40 measures the temperature of the fuel entering FSU 18 through fuel inlet 22. Pressure sensor 42 measures the pressure of the vacuum drawn on vacuum chamber 28 and vacuum line 30. Temperature data from temperature sensor 40 and pressure data from pressure sensor 42 are sent to control system 44. Control system 44 regulates the vacuum drawn on vacuum chamber 28 based on the received temperature and pressure data. Control system 44 varies the pressure in vacuum chamber 28 on the vacuum side of oxygen permeable membrane 26 by opening or closing valve 46 positioned between ejector 32 and vacuum chamber 28 in vacuum line 30. Control system 44 and valve 46 operate to optimize the efficiency of the fuel deoxygenation process.

Figure 3:
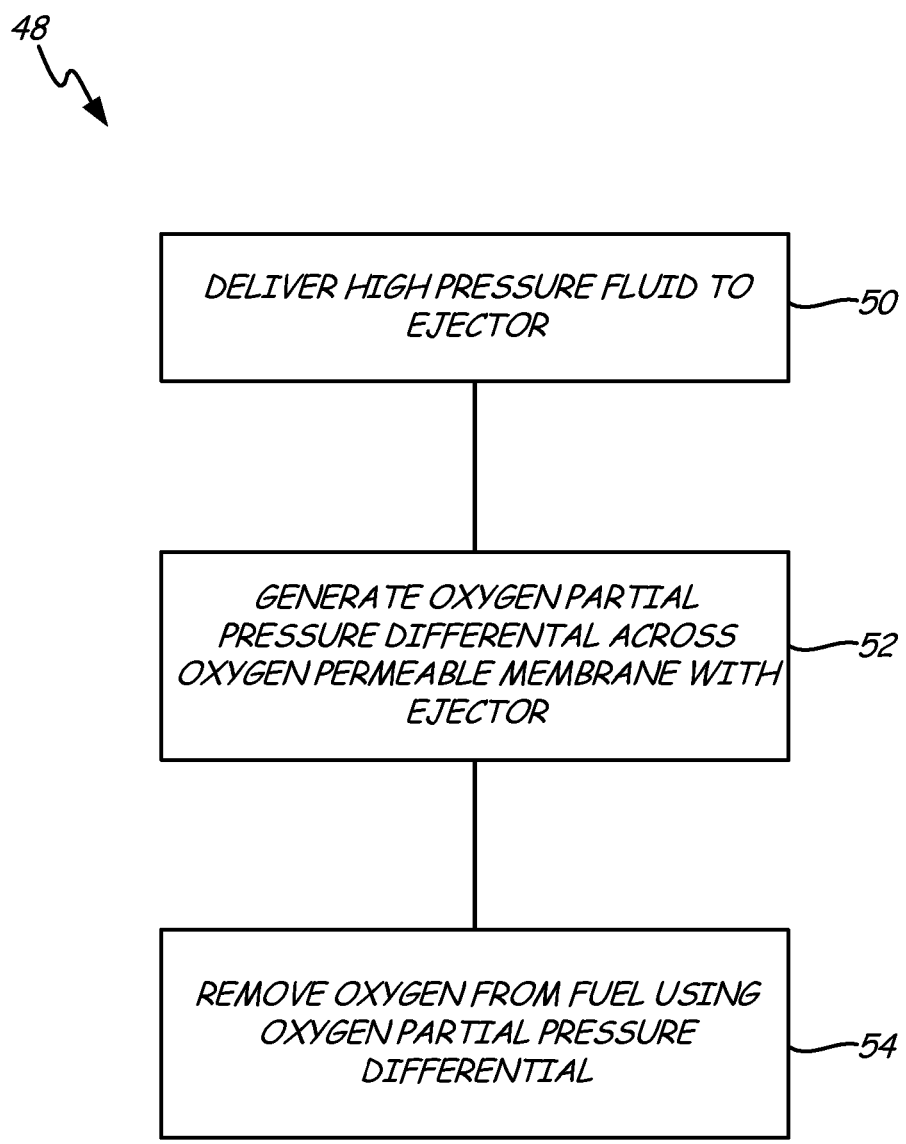
FIG. 3 is a simplified flow diagram of a method for fuel deoxygenation.

FIG. 3 illustrates a simplified flow diagram of a method for deoxygenating a fuel using the above described fuel delivery systems. Method 48 includes delivering a high pressure fluid to an ejector in step 50. High pressure fluid from high pressure fluid source 34 is delivered ejector 32. In step 52, an oxygen partial pressure differential is generated across an oxygen permeable membrane in contact with the fuel. The vacuum drawn on vacuum chamber 28 generates an oxygen partial pressure differential across oxygen permeable membrane 26. Oxygen permeable membrane 26 is in contact with the fuel in fuel flow path 16 and separates fuel flow path 16 from vacuum chamber 28. The vacuum drawn in vacuum chamber 28 is created using only ejector 32—no additional vacuum source is employed. In step 54, oxygen is removed from the fuel using the oxygen partial pressure differential. Oxygen (and other constituents) passes through oxygen permeable membrane 26 from the fuel side of the membrane to the vacuum side of the membrane because the vacuum side has a lower oxygen partial pressure. The fuel is unable to permeate oxygen permeable membrane 26, so the oxygen and fuel are separated. The oxygen removed from the fuel is removed from vacuum chamber 28 due to the vacuum created by ejector 32.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel stabilization unit comprising:
   an oxygen permeable membrane;
   a fuel passage on a side of the membrane;
   a chamber on an other side of the membrane;
   a venturi effect ejector coupled to the chamber and having an area ratio between about 0.05 and about 0.2 of an area of a suction oxygen flow opening in the ejector to an area of an opening that permits the motive fluid flow in the ejector from the high pressure fluid source, and wherein the ejector is a first vacuum source and a secondary vacuum source is not coupled to the chamber;
   a high pressure fluid source for providing high pressure fluid as a motive fluid to the ejector to generate a vacuum in the chamber to generate an oxygen partial pressure differential across the membrane for fuel deoxygenation, the high pressure fluid source selected from the group consisting of fluid bled from a fan of a gas turbine engine, fluid bled from a compressor of a gas turbine engine and combinations thereof; and
   a valve positioned between the oxygen permeable membrane and the ejector and configured to regulate the oxygen partial pressure differential across the oxygen permeable membrane;
   a temperature sensor for monitoring temperature of fuel in the fuel passage;
   a pressure sensor for monitoring the oxygen partial pressure differential; and
   a control system for operating the valve based on inputs received from the temperature sensor and the pressure sensor.

2. The fuel stabilization unit of claim 1, wherein the chamber is a vacuum chamber.

3. The fuel stabilization unit of claim 1, wherein the oxygen permeable membrane contains tetrafluoroethylene.

4. The fuel stabilization unit of claim 1, wherein the ejector has an area ratio of about 0.1.

5. The fuel stabilization unit of claim 1, wherein the ejector area ratio is between 0.05 and 0.2 to allow for a low motive air flow rate between 0.001 kg/s (0.002 pound mass per second) and 0.1 kg/s (0.2 pound mass per second) to eliminate the need for a secondary vacuum source.

6. A fuel deoxygenation system comprising:
   a fuel stabilization unit comprising:
      a fuel flow path comprising:
         a fuel inlet; and
         a fuel outlet;
      a vacuum chamber; and
      an oxygen permeable membrane separating the fuel flow path and the vacuum chamber;
   a vacuum source for reducing pressure in the vacuum chamber to generate an oxygen partial pressure differential across the oxygen permeable membrane, wherein the vacuum source consists of an ejector having an area ratio between about 0.05 and about 0.2 and a high pressure fluid source;
   a valve positioned between the oxygen permeable membrane and the ejector and configured to regulate the oxygen partial pressure differential across the oxygen permeable membrane;
   a temperature sensor for monitoring temperature of fuel in the fuel stabilization unit;
   a pressure sensor for monitoring the oxygen partial pressure differential; and
   a control system for operating the valve based on inputs received from the temperature sensor and the pressure sensor.

7. The fuel deoxygenation system of claim 6, wherein the oxygen permeable membrane contains tetrafluoroethylene.

8. The fuel deoxygenation system of claim 6, wherein the ejector has an area ratio of about 0.1.

9. The fuel deoxygenation system of claim 6, wherein the vacuum source reduces the pressure in the vacuum chamber to between about 2.0 kPa (15 torr) and about 6.7 kPa (50 torr).

10. The fuel deoxygenation system of claim 6, wherein the high pressure fluid source is a fan of a gas turbine engine.

11. The fuel deoxygenation system of claim 6, wherein the high pressure fluid source is a compressor of a gas turbine engine.

12. The fuel deoxygenation system of claim 6, further comprising:
   a throttle valve to regulate fluid flow from the high pressure fluid source.

13. The fuel deoxygenation system of claim 6, wherein the ejector is coupled to the chamber, wherein a secondary vacuum source is not coupled to the chamber.

14. The fuel deoxygenation system of claim 11, wherein the ejector is coupled to the chamber, wherein a secondary vacuum source is not coupled to the chamber.

15. A method for deoxygenating a fuel, the method comprising:
   delivering a high pressure fluid to an ejector;
   generating an oxygen partial pressure differential across an oxygen permeable membrane in contact with the fuel using the ejector and without a secondary vacuum source;
   operating a valve positioned between the oxygen permeable membrane and the ejector based on inputs received from a temperature sensor for monitoring temperature of the fuel and a pressure sensor for monitoring the oxygen partial pressure differential, the valve configured to regulate the oxygen partial pressure differential across the oxygen permeable membrane; and
   removing oxygen from the fuel using the oxygen partial pressure differential.

16. The method of claim 15, wherein the ejector has an area ratio between about 0.05 and about 0.2.

17. The method of claim 16, wherein the high pressure fluid delivered to the ejector has a flow rate between about 0.001 kg/s and about 0.1 kg/s.

18. The method of claim 16, wherein a ratio of motive flow through the ejector to vacuum flow through the ejector is less than about 0.3.

19. The fuel deoxygenation system of claim 13, wherein the ejector area ratio is between 0.05 and 0.2 to allow for a low motive air flow rate between 0.001 kg/s (0.002 pound mass per second) and 0.1 kg/s (0.2 pound mass per second) to eliminate the need for a secondary vacuum source.

* * * * *